Sept. 25, 1923.
C. MEISSNER
1,468,972
FISH SLICING AND BACKBONE REMOVING MACHINE
Filed March 8, 1923
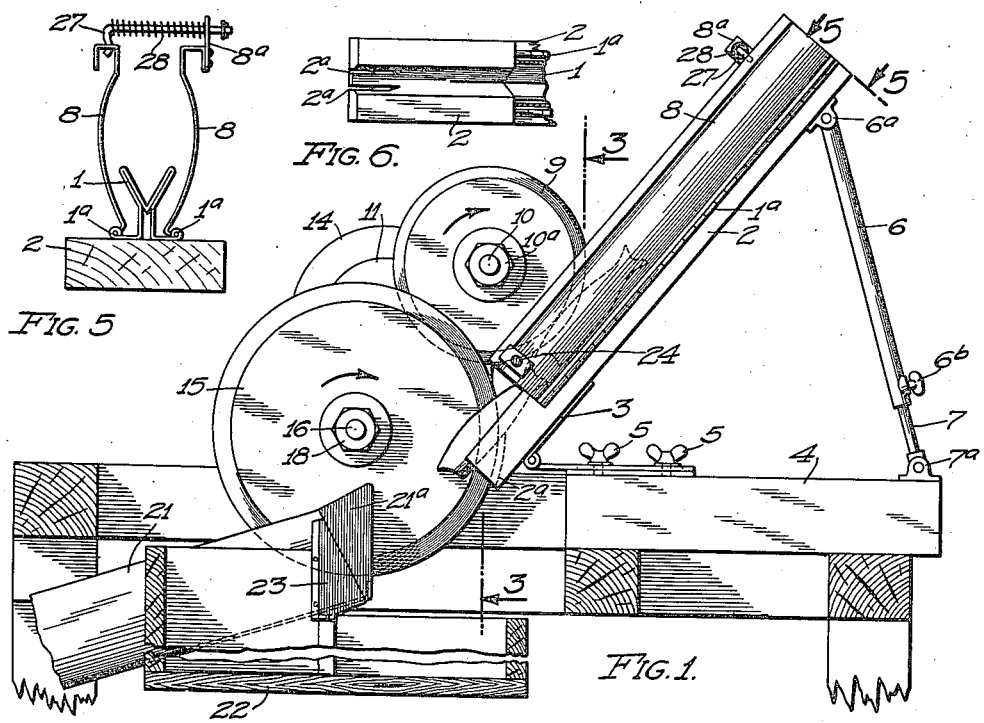
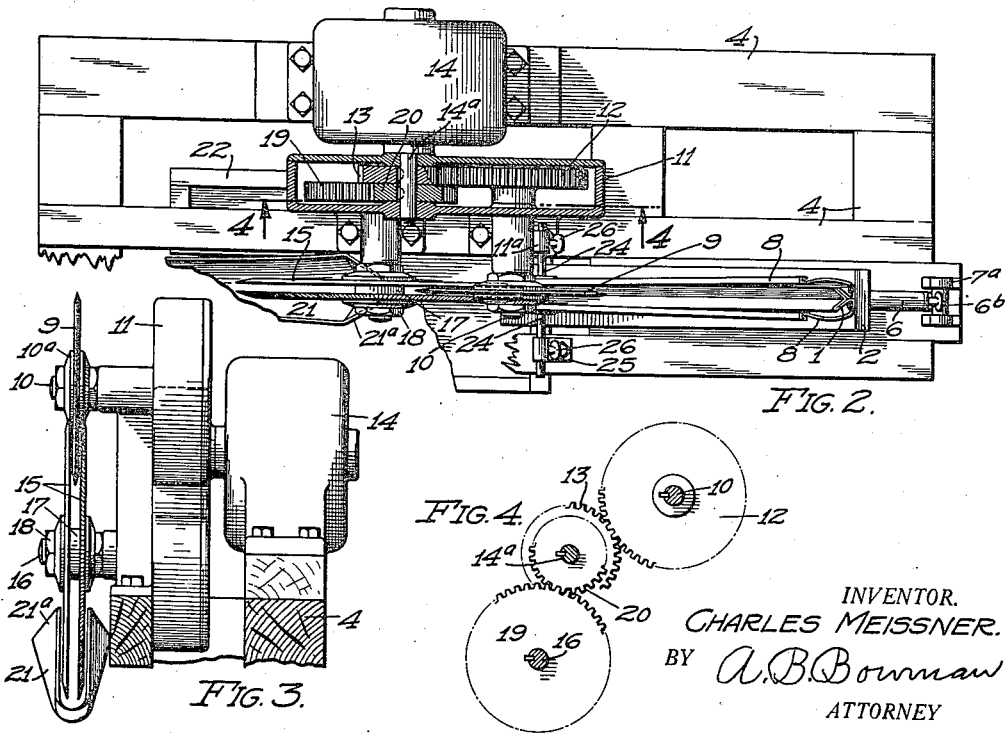
INVENTOR.
CHARLES MEISSNER.
BY A. B. Bowman
ATTORNEY Patented Sept. 25, 1923.

1,468,972

UNITED STATES PATENT OFFICE.

CHARLES MEISSNER, OF SAN DIEGO, CALIFORNIA.

FISH SLICING AND BACKBONE-REMOVING MACHINE.

Application filed March 8, 1923. Serial No. 623,634.

*To all whom it may concern:*

Be it known that I, CHARLES MEISSNER, a citizen of the United States, residing at San Diego, in the county of San Diego and State of California, have invented a certain new and useful Fish Slicing and Backbone-Removing Machine, of which the following is a specification.

My invention relates to machines for slicing fish and removing the backbones thereof, and the objects of my invention are: First, to provide a machine of this class which will reduce to a minimum the time, expense for labor and factory floor space required to slice and remove the backbone of fish, for packing, smoking and drying purposes; second, to provide a machine of this class which will simultaneously split the belly of the fish, make two incisions in either side of the backbone of the fish and cut through the back thereof, will throw the separated backbone into a chute and deflect the edible sides of the fish into containers ready for smoking, drying, or otherwise treating the same for packing purposes; third, to provide a machine of this class in which the capacity thereof is limited only by the speed at which the fish are fed into the machine; fourth, to provide a machine of this class in which the guide means for the fish is manually and resiliently adjustable to accommodate different sizes of fish; fifth, to provide such a machine in which the guide means is substantially always in alignment with the cutting means; sixth, to provide a machine of this class in which the cutting members are so positioned and arranged relatively to each other that the fish will pass immediately from one cutting member to the other by gravity and by the momentum produced by the first cutting member, and whereby the first cutting member splitting the fish at its normally under side will separate the side portions of the fish by means of the beveled edges of the cutting member and will permit the other cutting members to freely cut through the back of the fish; seventh, to provide a machine of this class in which the guiding means may be positioned differently relatively to the cutting members, dependent upon the sizes of fish required to be cut; eighth, to provide a machine of this class in which the cutting members for cutting out and removing the backbone are made to accommodate the certain sizes of fish; ninth, to provide a novelly constructed machine of this class, and tenth, to provide a machine of this class which is very simple and economical of construction proportionate to its functions, durable, compact, efficient, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a side elevational view of my machine with the frame and container partly broken away and in section to facilitate the illustration; Fig. 2 is a plan view thereof with the gear case and the driving pinion in section and showing other parts broken away to facilitate the illustration; Fig. 3 is a fragmentary elevational view of my machine taken through 3—3 of Fig. 1; Fig. 4 is a sectional elevational view of the gear driving mechanism taken through 4—4 of Fig. 2; Fig. 5 is an end view showing the trough member and construction of the manually and resiliently adjustable guide means, and Fig. 6 is a fragmentary view of the lower or end portion of the guide means adjacent the second cutting member.

Like characters of reference refer to similar parts and portions throughout the several views of the drawings.

The guide member 1, guide support 2, hinge member 3, supporting frame 4, wing screws 5, telescoping supporting members 6 and 7, side guide members 8, cutting member 9, shaft 10, journal and housing member 11, gear 12, pinion 13, motor 14, cutting members 15, spindle 16, spacer member 17, nuts 18, gear 19, pinion 20, chute 21, containers 22, deflecting members 23, guide adjusting members 24, support 25, thumbscrews 26, spreader member 27, and the spring 28, constitute the principal parts and portions of my fish slicing and backbone removing machine.

The fish are fed by any convenient means to the guiding means which consist of the supporting guide member 1 and the guide side members 8. The supporting guide member 1 is V-shaped for the reception of the back portion of the fish and is secured to the guiding means supporting member 2 which is hinged near its lower end by means of the hinge member 3 on the supporting frame 4, the one portion of said hinge member being adjustably secured to the supporting frame by means of the wing screws 5. The upper, free end of the supporting member 2 is supported by the telescoping supporting members 6 and 7, the latter of which extends into the former and are respectively pivotally mounted at their ends on the member 2 and the supporting frame 4 by means of the journal members $6^a$ and $7^a$. Said members 6 and 7 are secured relatively to each other by means of the wing screw $6^b$. The V-shaped portion of the member 1 is of substantially rigid construction and is provided at its lower portion by hinged portions $1^a$ on either side to which are hinged the curved, resilient, side members 8, substantially as shown in Fig. 5 of the drawings. The lower end of the supporting member 2 is a continuation of the V-shaped, channel portion of the member 1, however terminating from a V-shaped channel into a semi-circular channel, as shown best in Fig. 6 of the drawings.

It will be noted that the fish as fed into this machine have first been beheaded and their entrails removed and sorted according to size.

As the fish are fed down the guiding means by gravity they first encounter the disc-shaped cutting member 9 which splits the normally under side or the belly of the fish, as shown by dotted lines in Fig. 1 of the drawings, the revolution of the cutting member 9 keeping the fish against the guiding means and forcing the same toward the other cutting members 15. The cutting member 9 is mounted on the spindle 10 by means of the nut $10^a$, which spindle is revolubly mounted in the journal and housing member 11 and is provided at its other end with a spur gear 12, which meshes with a spur pinion 13 keyed to the motor shaft $14^a$ of the motor 14, which motor is mounted on the supporting frame 4. I have provided two disc-shaped cutting members 15 which are mounted on the spindle 16, spaced apart by the spacer member 17 and secured on said spindle by the nut 18. The spindle 16 is revolubly mounted in the journal and housing member 11 and is provided at its other end with a spur gear 19 which meshes with a spur gear 20, also keyed to the motor shaft $14^a$. It will be noted that the cutting members 15 are of larger diameter than the cutting member 9 but that the peripheral speeds of said members are substantially the same, due to the smaller diameter of the driving pinion for the cutting members 15. It will also be noted that the member 9 is positioned intermediate the cutting members 15 for economy of space and further to bring their effective cutting edges of the two members close to each other. It will also be noted that the cutting members 15 may be differently spaced apart by using different sizes of spacer members 17 to take care of the different thicknesses of backbone of the different fish. It will be further noted that the members 15 are beveled on the outer edges so that the backbone cut from the fish will not be crammed between the cutting members but will be carried by the centrifugal force of the cutting member tangentially between the cutting members into the chute 21. The beveled edge of the members 15 also deflects the edible portions of the fish to the side into the containers 22. It will be still further noted that the cutting edges of the members 15 extend into the slot $2^a$ in the lower portion of the guide supporting member 2 so that the fish when being cut will rest in the semi-circular groove of said member and will thus make a clean incision. The forward portion of the chute 21 is bent inwardly so that the edible portions of the fish are not likely to be thrown into the chute but are deflected into the containers 22. Said containers are also provided with deflectors 23 so that the edible portions of the fish will not fall outside of the containers.

It will be noted that the ease with which the fish are fed into the machine is dependent upon the width or spread of the guide means at the feeding end, and the efficiency and accuracy of the splitting of and the removal of the backbone of the fish are dependent upon contraction, resiliency and alignment of the lower portion of the guide means with the cutting members. To take care of the contraction of the guiding means at the lower end, I have provided guide adjusting members 24 on either side of the guide means, which bear against the upper, flanged portion of the side members 8. Said members 24 are reciprocally mounted in a lug $11^a$ on the journal and housing member 11 and a support 25 secured to the supporting frame. Said members 24 are held in certain relative position with each other by the thumbscrews 26. The spreading means near the feeding end of the guide means consist of a spreader member 27, reciprocally mounted in a lug $8^a$ on one of the side members, the other end of which spreader member is positioned in a recess in the other of said side members 8. Positioned between the lug 8ª of one of the side members 8 and the hook or engaging portion of the member 27 with the other of said side members and supported by said spreader member, is a compression spring 28 for resiliently spreading said side members.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a machine of the class described, a guide means, a cutting member mounted at the upper side of said guide means and spaced apart cutting members positioned from and on either side from said first mentioned cutting member and extending into said guide means.

2. In a machine of the class described, a guide means, a cutting member mounted at the upper side of said guide means, spaced apart cutting members positioned from and on either side from said first mentioned cutting member and extending into said guide means, and a means in connection with said last mentioned cutting members for receiving a portion of the cut product and for deflecting other portions thereof.

3. A machine of the class described, including guiding means, spaced apart cutting members extending a short distance into said guiding means and a receiving and deflecting means positioned contiguous to said cutting members for receiving a portion of the product between said cutting members and deflecting other portions on the other side thereof.

4. A machine of the class described, including guiding means, spaced apart cutting members beveled only on their outer edges extending a short distance into said guiding means, and a receiving and deflecting means positioned contiguous to said cutting members for receiving a portion of the product between said cutting members and deflecting other portions on the other side thereof.

5. A machine of the class described, including an adjustable, downwardly converging guide means, a cutting member positioned on the open side of and contiguous to said guide means, and other cutting members spaced apart from each other and positioned on either side and in close proximity to said first mentioned cutting member.

6. A machine of the class described, including an adjustable downwardly converging guide means, a cutting member positioned on the open side of and contiguous to said guide means, other cutting members spaced apart from each other and positioned on either side and in close proximity to said first mentioned cutting member, means for driving said cutting members, and a chute in connection with said last mentioned cutting members.

7. A machine of the class described, including a supporting frame, a resilient guide means, adjustably supported on said supporting frame, spaced apart cutting members extending a short distance into said guide means, and means for driving said cutting members.

8. A machine of the class described, including a supporting frame, a resilient guide means, adjustably supported on said supporting frame, spaced apart cutting members extending a short distance into said guide means, means for driving said cutting members, and a receiving and deflecting means in connection with said cutting members.

9. A machine of the class described, including a supporting frame, a guide means adjustably supported by said supporting frame and positioned at an angle with the horizontal, spaced apart cutting members revolubly mounted near the lower end of said guide means, and a chute and deflecting means positioned contiguous to said cutting members.

10. A machine of the class described, including a supporting frame, a resilient, adjustable guide means, angularly positioned and adjustable relatively to said supporting means, a revoluble cutting member positioned at the open side and contiguous to said guide means, spaced apart cutting members, also revolubly mounted, positioned at the side of said first mentioned cutting member, their effective cutting edges being in close proximity to each other.

11. A machine of the class described, including a supporting frame, a resilient, adjustable guide means, angularly positioned and adjustable relatively to said supporting means, a revoluble cutting member positioned at the open side and contiguous to said guide means, spaced apart cutting members, also revolubly mounted, positioned on the side of said first mentioned cutting member, their effective cutting edges being in close proximity to each other, and a chute positioned under said last mentioned cutting members for receiving a sliced portion between said members.

12. A machine of the class described, including a supporting frame, a resilient, adjustable guide means, angularly positioned and adjustable relatively to said supporting means, a revoluble cutting member positioned at the open side and contiguous to said guide means, spaced apart cutting members, also revolubly mounted, positioned on the side of said first mentioned cutting member, their effective cutting edges being in close proximity to each other, a chute positioned under said last mentioned cutting members for receiving the sliced portions between said members, and deflecting means positioned on the outer sides of said last memtioned cutting members.

In testimony whereof, I have hereunto set my hand at San Diego, California, this 3d day of March, 1923.

CHARLES MEISSNER.